UNITED STATES PATENT OFFICE.

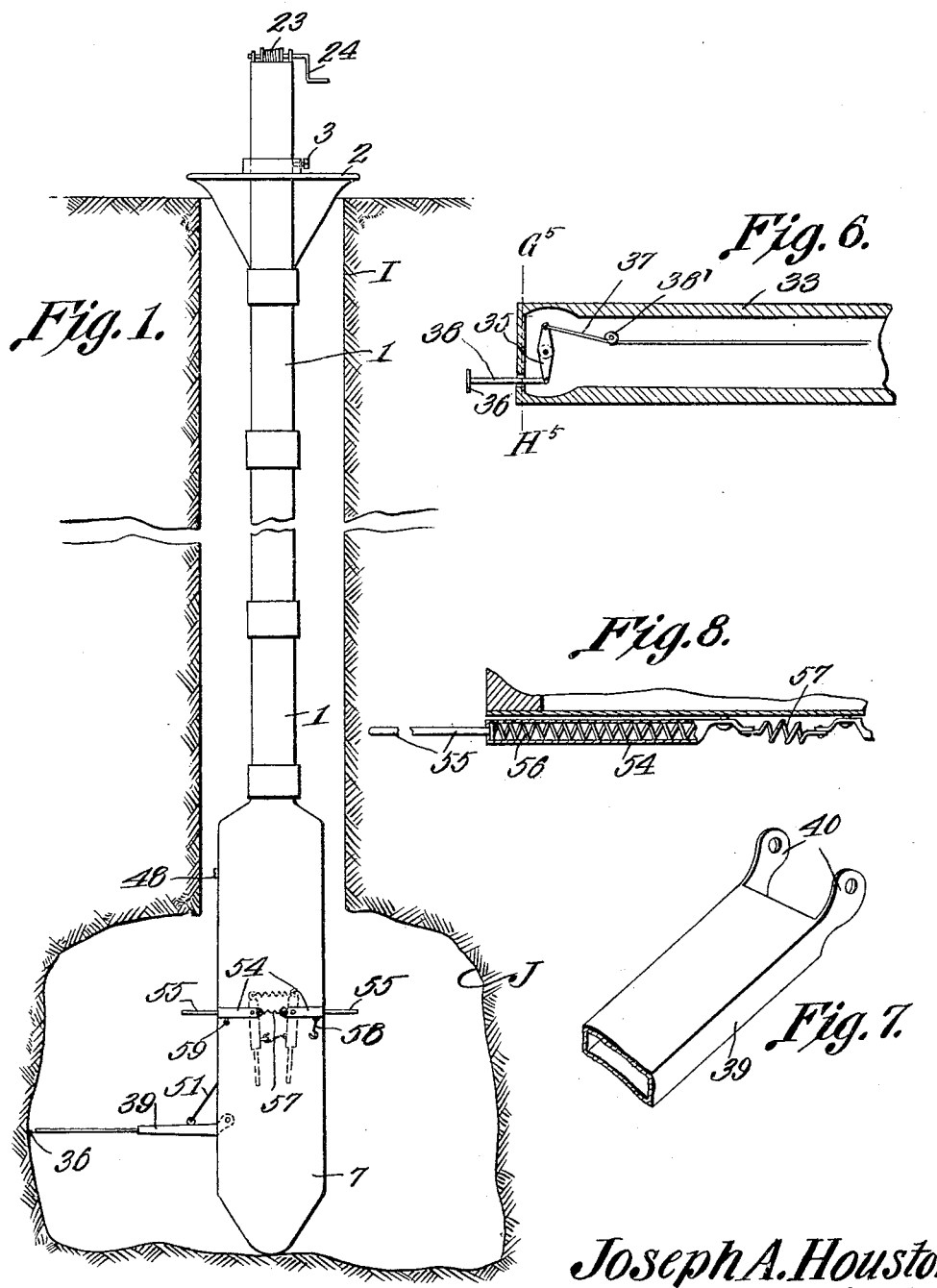

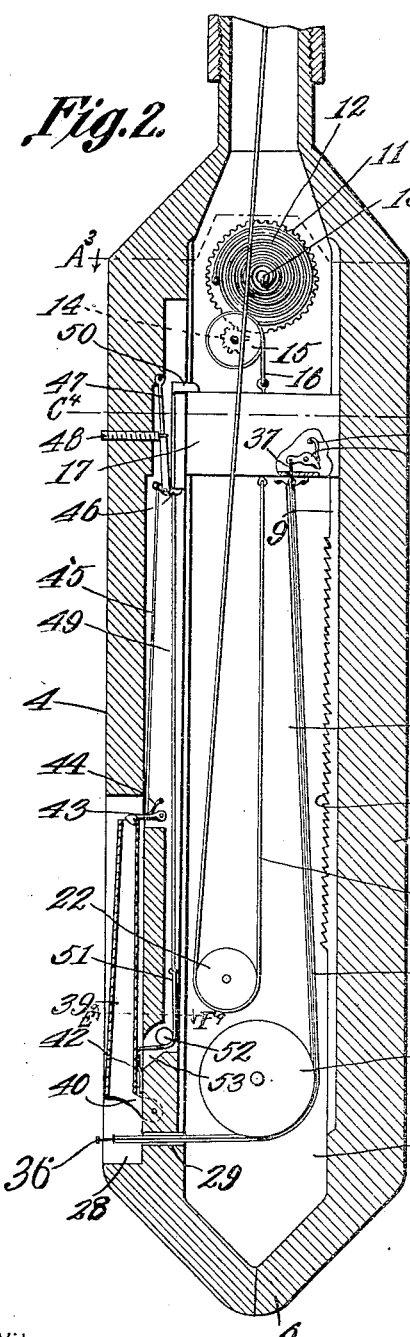
J. A. HOUSTON.
TESTER FOR BLAST CAVITIES.
APPLICATION FILED JUNE 5, 1913.
1,112,699.
Patented Oct. 6, 1914.
2 SHEETS—SHEET 2.
Joseph A. Houston, Inventor

JOSEPH A. HOUSTON, OF EUREKA SPRINGS, ARKANSAS.

TESTER FOR BLAST-CAVITIES.

1,112,699.  Specification of Letters Patent.  Patented Oct. 6, 1914.

Application filed June 5, 1913. Serial No. 771,920.

*To all whom it may concern:*

Be it known that I, JOSEPH A. HOUSTON, a citizen of the United States, residing at Eureka Springs, in the county of Carroll and State of Arkansas, have invented a new and useful Tester for Blast-Cavities, of which the following is a specification.

This invention relates to testers for blast cavities such as produced by the explosion of cartridges at the bottom of a drilled hole.

Heretofore considerable difficulty has been experienced in accurately determining the capacity of a cavity thus formed and, as a result, considerable time, labor and material has been wasted in blasting operations. Invariably, after a deep hole has been drilled in solid rock, it is necessary to calculate the amount of powder required to produce the desired blast, and, consequently, the bottom of the bore must be sprung or chambered so as to produce a cavity of sufficient size to hold the necessary amount of powder. As both the height and diameter of the cavity must be determined and as the presence of dust within the cavity must be provided for, it has, obviously, been a difficult matter to accurately determine the capacity of the cavity. Unless this capacity can be determined with more or less accuracy, a considerable loss is likely to be entailed. For example, if it is deemed necessary to utilize twenty kegs of powder, the powder is poured into the hole when it is believed that the cavity is of sufficient size. Obviously, however, should the cavity be too small, the powder deposited therein becomes wasted and it becomes necessary either to clean out the hole and cavity or else to proceed with the formation of a new hole and cavity in the rock.

The principal object of the present invention is to provide a tool by means of which the capacity of the cavity can be accurately determined, this tool being capable of indicating both the height and diameter of the cavity and, where powdered material or dust has piled within the cavity, the tool will indicate the presence thereof.

A further object is to provide a tester of this character which will not become hung within the hole but can always be placed within and removed from the hole readily.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is an elevation of the tool in position within a hole and cavity. Fig. 2 is an enlarged longitudinal section through the lower end of the tool. Fig. 3 is a section on line $A^3$—$B^3$ Fig. 2. Fig. 4 is a section on line $C^4$—$D^4$ Fig. 2. Fig. 5 is an enlarged transverse section through the measuring tape on line $G^6$—$H^6$ Fig. 6. Fig. 6 is a plan view of the free end portion of the measuring tape and showing the lock controlling head at the end thereof. Fig. 7 is a perspective view of a portion of the support which may be used in connection with the measuring tape. Fig. 8 is an enlarged longitudinal section through one of the arms employed for determining the height of a cavity. Fig. 9 is a section on the line $E^9$—$F^9$ Fig. 2.

Referring to the figures by characters of reference 1 designates a tubular stem formed of any desired number of pipe sections secured together, this stem being provided, near its upper end, with a collar 2 adapted to rest upon the surface of the rock at the mouth of the bore so as thus to support the tool within the bore. Stem 1 is slidably mounted in collar 2 and is secured against movement relative thereto, by means of a set screw 3 or the like.

The lower end of stem 1 is formed with a casing made up of opposed spacing strips 4 and 5 merging together at their lower ends as shown at 6, side plates 7, Fig. 4, being secured to the sides of the spacing strip 5. Thus a chamber 8 is formed within the casing thus produced, this chamber communicating with the interior of the stem 1. Each of the spacing strips 4 and 5 has a longitudinal rib 9, Fig. 3, along the inner side thereof and one of these ribs is formed with ratchet teeth 10, Fig. 2. Mounted for rotation within the upper portion of the casing is a gear 11, there being a coiled spring 12 secured at one end to this gear and at its other end to the pin 13 on which the gear is adapted to rotate. A small gear 14 meshes with gear 11 and rotates with a drum 15 to which is secured a cord 16 or other flexible element fastened to the upper portion of a hollow cross head 17. This cross head extends across the interior of the casing and has opposed channels 18 into which the ribs 9 project. A dog 19 is pivotally mounted within the cross head 17 and a spring 20 serves to hold this dog normally in a position where it will not engage the ratchet teeth 10. An operating cord 21 extends downwardly from the cross head and under a guide sheave 22 located in the lower portion of the chamber 8, this operating cord being thence extended upwardly past the cross head and through stem 1 to a winding drum 23 mounted at the upper end of the stem 1, any suitable means, such as a crank 24, being provided for winding the operating cord upon this drum 23. From the foregoing it will be apparent that when the cord 21 is wound upon the drum 23, the cross head 17 will be drawn downwardly along the guide ribs 9, cord 16 being unwound from drum 15 so as to cause said drum to rotate and gear 14 to rotate the gear 11. Spring 12 will therefore be placed under tension so that, when the cross head is released, this spring will return it to its raised or normal position.

A longitudinal recess 28 is formed in the outer face of the spacing strip 4, and an opening 29 extends from the lower portion of the chamber 8 to the lower end portion of this recess. A guide sheave 30 is mounted for rotation in the lower portion of chamber 8 and is engaged by a measuring tape 31 one end of which is secured to the bottom of the cross head 17 while the other end extends through opening 29 and into the recess 28. This measuring tape 31 is formed of broad spring strips 32 separated by narrow side spring strips 33 forming a longitudinal passage 34 therebetween, this passage extending throughout the length of the tape 31. A lever 35, Fig. 6, is pivotally mounted in the passage in the free end portion of the tape and has a forwardly extending arm 38 pivoted to one end and provided, at its free end, with a button 36. The short arm of the lever is connected to one end of a cord 37 or the like which extends longitudinally within the passage 34 and may be guided by a sheave 38'. The other end of the cord extends into the hollow cross head 17 and is attached to one end of the dog 19. Thus it will be seen that when the button 36 is pushed back toward the opening 29, cord 37 will be pulled longitudinally, thus shifting one end of the dog 19 outwardly where it will engage one of the teeth 10. Under normal conditions however, spring 20 pushes the dog downwardly and backwardly so that it will not engage the teeth 10, and consequently, the button 36 is held projected outwardly.

A guide sleeve 39 is normally extended longitudinally within the recess 28, this sleeve being provided with ears 40 which are pivotally connected to the spacing strip 4. A spring 42 is connected to the wall of the recess 28 and is adapted to engage the inner wall of sleeve 39 and to be placed under compression when the sleeve is housed within the recess. A latch 43 is pivotally mounted within the strip 4 and is held by a spring 44 normally in engagement with the upper end of sleeve 39 so as thus to hold the sleeve within the recess 28. A cord or other flexible element 45 extends upwardly from the latch and is secured to one end of a lever 46 which is fulcrumed upon the lower end of a spring hanger 47 suspended from strip 4 beyond one side of the path of cross head 17. An adjusting screw 48 extends through the strip 4 and engages the hanger 47. By means of this adjusting screw said hanger can be pressed inwardly so as to bring lever 46 into the path of the cross head 17. By rotating the screw in the opposite direction, the hanger can be caused to move or swing laterally, thereby bringing lever 46 out of the path of cross head 17 so that said cross head can move downwardly without actuating the lever.

A rod 49 is slidably mounted within the spacing strip 4 and is provided, at its upper end, with a head 50 which extends over the cross head 17 and into the path thereof. The lower end of this rod is connected by a cord 51 or the like to the guide sleeve 39, this cord being extended under a guide sheave 52 located within an opening 53 formed in the strip 4.

Pivotally connected to one side of the casing are oppositely extending arms 54, Fig. 1. Each of these arms is tubular as shown in Fig. 8 and has a finger 55 slidably mounted in the free end portion thereof. A spring 56 is housed within each arm and bears against the finger so as to hold it projected yieldingly. A spring 57 is interposed between the two arms and engages them. This spring serves to hold the arms normally projected at right angles to the spacing strips 4 and 5. Any suitable means, such as a hook 58 and an eye 59 may be employed for securing the arms 54 in substantially parallel relation, as indicated by dotted lines in Fig. 1.

When it is desired to use the tool for determining the height of a cavity and the diameter thereof, where said diameter is of considerable length, the hook 58 is disengaged from the eye 59 and the tool is then inserted into the bore I until the bottom of the casing is brought onto the bottom of the cavity J. During this downward movement of the tool the arms 54 and fingers 55 will slide downwardly along the wall of the bore, the said arms extending along upwardly diverging lines. As soon as the arms pass into the cavity F, the spring 57 will move them outwardly to their normal positions, as indicated in Fig. 1. As the distance between the pair of arms and the end of the casing is known, it will be apparent that by lifting the tool until the fingers 55 strike the top of the cavity, the height of the cavity can be determined readily. After the foregoing measurement has been obtained the operator proceeds to wind the operating cord 21 upon drum 23. This will cause the cross head 17 to slide downwardly along its guide ribs 9, the spring 12 at the same time being placed under stress. If the tool is to be used for measuring a large cavity, the screw 48 is adjusted inwardly before the tool is lowered so as to swing hanger 47 and cause lever 46 to extend into the path of cross head 17. Thus it will be seen that when the cross head is lowered in the manner described, it will strike one end of lever 46 and cause the other end of the lever to pull upwardly on cord 45. Thus latch 43 will be disengaged from the guide 39 and said guide will swing downwardly and outwardly until it assumes a position at right angles to the casing, this movement being produced by the action of spring 42 which is normally under stress. When the guide sleeve is thus brought to its outwardly extended position, it surrounds opening 29. As cross head 17 continues to move downwardly the tape is moved longitudinally within the sleeve and finally emerges from the end thereof and when the button 36 comes into contact with the wall of the cavity, lever 35 will be operated in the manner hereinbefore described, thus transmitting motion through cord 37 to dog 19 and causing said dog to swing outwardly so as to engage the nearest tooth 10. This will promptly stop further movement of cross head 17 and further winding of the operating cord 21 will thus be prevented. By repeating this operation after turning the tool so as to extend the measuring tape in different directions, an accurate idea as to the capacity of the cavity can be obtained. Upon the completion of the measuring operation, the drum 23 can be released and spring 12 will promptly wind the cord 16 upon its drum 15, thus causing the cross head 17 to move upwardly to its initial position and causing the tape to withdraw into the chamber 8 until the lever 35 is brought into recess 28. Upon the completion of the upward movement of cross head 17, it strikes the head 50 and pulls it upwardly so that sleeve 39 is thus swung upwardly into recess 28 where it is engaged by the catch 43.

When it is desired to measure small cavities it is not necessary to use the guide sleeve 39 and, therefore, by adjusting screw 48 so as to retract the lever 46 from the path of cross head 17, said cross head can be moved downwardly without actuating lever 46.

Sleeve 39 is only to be used where the measuring tape is projected such a distance from the casing as to require some support to prevent it from sagging.

By utilizing the lever 35 with the button 36 and the delicate spring 20 for holding the button projected, it will be apparent that the dog 19 will be actuated whenever button 36 is brought into contact with any kind of an obstruction. For example, should the button be brought against a pile of dust, the dog will be actuated and the presence of the dust within the cavity will thus be indicated.

In some forms of testers heretofore used, it has been customary to employ needles which, when projected, have been capable of passing entirely through piles of dust so that it has been impossible to allow for such piles within the cavity. In the structure herein described, however, the presence of a pile of dust will be promptly indicated as described.

It will be apparent that when the tool is withdrawn from the bore, the fingers 55 will be pushed downwardly when brought into contact with the top of the cavity and the said fingers will thus slip readily through the bore without becoming hung upon any portion of the wall thereof.

What is claimed is:—

1. A tester for cavities, including a casing, a flexible measuring element carried by the casing, means for projecting said element laterally from the casing, and means for automatically locking said first named means against further movement when the projected end of the measuring element is brought into contact with an obstruction.

2. A tester for cavities, including a casing, a flexible measuring element carried by the casing, mechanism for projecting said element laterally from the casing, means for locking said element against movement from the casing, and means carried by said element for engaging an obstruction and actuating the locking means.

3. A tester for cavities, including a casing, a measuring element carried by the casing, mechanism for projecting said element from the casing, coöperating fixed and movable locking devices carried by the casing and measuring element respectively, and means upon the outer end of the measuring element adapted to engage and to be actuated by an obstruction in the path of said element to shift the movable locking device into engagement with the fixed locking device and stop the element projecting mechanism, said mechanism including means for automatically returning the measuring element and the mechanism to normal position.

4. A tester for cavities including a casing, a measuring element adapted to operate within the same, means for operating said element to project it beyond the casing, a lock for stopping the projection of the element, means carried by said element for engaging an obstruction and by such engagement actuating the lock, and means for automatically returning the element into the casing.

5. A tester for blast cavities and the like, including a casing, a cross head mounted to slide within the casing, a flexible measuring element connected to and adapted to be actuated by the cross head, means for guiding said element laterally within and from the casing, means for sliding the cross head, a device carried by the free end portion of the measuring element and adapted to contact with and to be actuated by an obstruction in the path of said element, and means operated by the said device when thus actuated for locking the cross head against movement in one direction.

6. A tester for cavities including a casing, a cross head mounted to slide therein, means for sliding the cross head downwardly, a flexible measuring element connected to and movable with the cross head, said element being bent laterally and extended through a wall of the casing, a controlling element mounted upon the free end portion of the measuring element and adapted to contact with and to be actuated by an obstruction in the path of the measuring element, a locking device under the control of said controlling element for securing the cross head and measuring element against downward movement when said controlling element is brought against an obstruction.

7. A tester for cavities including a casing, a cross head mounted to slide therein, means for sliding the cross head downwardly, a flexible measuring element connected to and movable with the cross head, said element being bent laterally and extended through a wall of the casing, a controlling element mounted upon the free end portion of the measuring element and adapted to contact with and to be actuated by an obstruction in the path of the measuring element, a locking device under the control of said controlling element for securing the cross head and measuring element against downward movement when said controlling element is brought against an obstruction, and means operated by said controlling element for automatically returning the cross head and the measuring element to their normal positions within the casing.

8. A tester for cavities including a casing, a cross head mounted to slide therein, means for sliding the cross head downwardly, a flexible measuring element connected to and movable with the cross head, said element being bent laterally and extended through a wall of the casing, a controlling element mounted upon the free end portion of the measuring element and adapted to contact with and to be actuated by an obstruction in the path of the measuring element, a locking device under the control of said controlling element for securing the cross head and measuring element against downward movement when said controlling element is brought against an obstruction, a guide hingedly connected to the casing, means for holding the guide in position against the casing, means operated by the cross head when moving downwardly for releasing the guide to position it to receive the measuring element, means for returning the cross head to normal position and means operated by the cross head during its return to normal position, for returning the guide to its first position.

9. A tester for blast cavities and the like including a casing, there being ratchet teeth extending longitudinally therein, a cross head, means operated from a point above the cavity for sliding the cross head downwardly, a flexible measuring element connected to and extended downwardly from the cross head and bent to extend through one wall of the casing, a locking device carried by the cross head and held normally out of engagement with the ratchet teeth, a controlling device at the free end of the measuring element and adapted to engage and to be shifted by an obstruction in the path of said element, and a flexible connection between said controlling device and the locking device for shifting said locking device into engagement with a ratchet tooth when the controlling device is shifted.

10. A tester for blast cavities and the like including a casing, there being ratchet teeth extending longitudinally therein, a cross head, means operated from a point above the cavity for sliding the cross head downwardly, a flexible measuring element connected to and extending downwardly from the cross head and bent to extend through one wall of the casing, a locking device carried by the cross head and held normally out of engagement with the ratchet teeth, a controlling device at the free end of the measuring element and adapted to engage and to be shifted by an obstruction in the path of said element, and a flexible connection between said controlling device and the locking device for shifting said locking device into engagement with a ratchet tooth when the controlling device is shifted, said measuring element having a longitudinal passage for the reception of said flexible connection.

11. A tester for blast cavities, including a casing, a measuring element carried by said casing and adapted to operate therein, means for projecting said element beyond one side wall of the casing, means carried by said element for engaging an obstruction to stop the operation of the first named means, oppositely extending spring controlled pivoted arms connected to the casing, and yieldingly projected fingers carried by the respective arms, said fingers constituting means for extending under and engaging the top of a cavity.

12. A tester for blast cavities and the like, including a casing, arms pivotally connected to opposite sides of the casing, yielding means connected to the arms for holding said arms normally projected in opposite directions beyond the casing, yieldingly projected fingers carried by the respective arms for extending under the top of a cavity, and coöperating means upon the arms for securing them in inactive positions.

In testimony that I claim the foregoing as my own, I have hereto affixed my signature in the presence of two witnesses.

JOSEPH A. HOUSTON.

Witnesses:
  B. B. ESLINGER,
  JNO. FULTON.

---

Copies of this patent may be obtained for five cents each, by addressing the "Commissioner of Patents, Washington, D. C."